July 3, 1923.

A. SAJESKI

AUTOMOBILE DIRECTION INDICATOR

Filed Jan. 31, 1923

1,460,921

Inventor

A. Sajeski

By J. K. Bryant

Attorney

Patented July 3, 1923.

1,460,921

UNITED STATES PATENT OFFICE.

ANTHONY SAJESKI, OF NANTICOKE, PENNSYLVANIA.

AUTOMOBILE DIRECTION INDICATOR.

Application filed January 31, 1923. Serial No. 616,142.

*To all whom it may concern:*

Be it known that I, ANTHONY SAJESKI, a citizen of the United States of America, residing at Nanticoke, in the county of Luzerne and State of Pennsylvania, have invented certain new and useful Improvements in Automobile Direction Indicators, of which the following is a specification.

This invention relates to certain new and useful improvements in automobile direction indicators and embodies a manually operable indicator arm, preferably in the form of an arrow, mounted upon the windshield frame of an automobile to be shifted to various positions to indicate the direction of movement of the vehicle equipped therewith.

The primary object of the invention embodies in an automobile direction indicator of the type above described the provision of special type of bracket that supports the operating shafts for the indicator arm.

With the above and other objects in view as the nature of the invention is better understood, the same consists of the novel form, combination and arrangement of parts hereinafter more fully described shown in the accompanying drawing and claimed.

Figure 1:
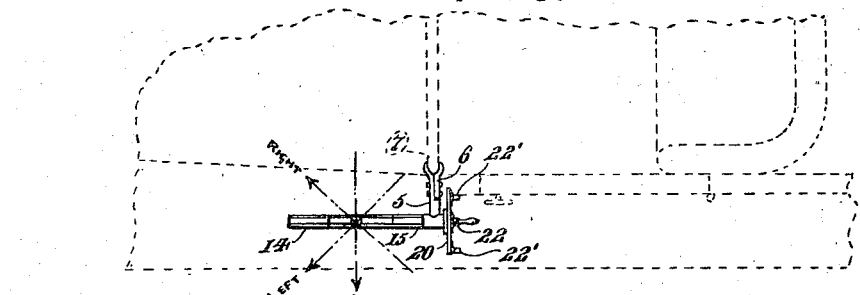
Figure 2:
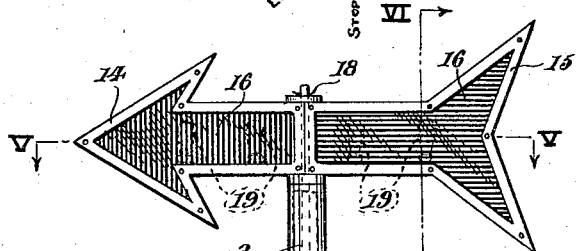
Figure 3:
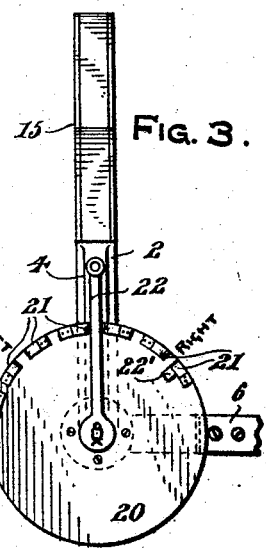
Figure 4:
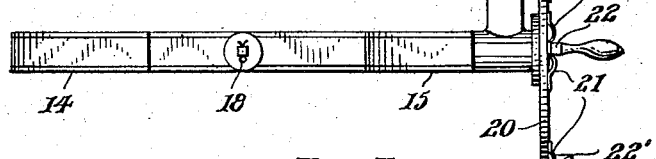
Figure 5:
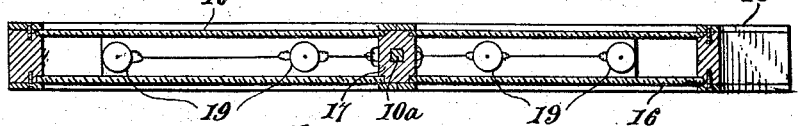
Figure 6:
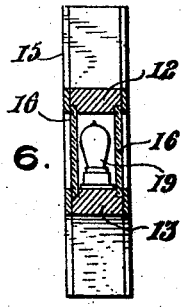
Figure 7:
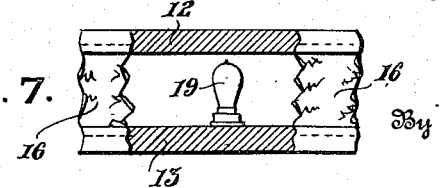

In the drawing, wherein like reference characters designate corresponding parts throughout the several views, Figure 1 is a top plan view of an automobile direction indicator constructed in accordance with the present invention, a portion of an automobile being illustrated by dotted lines with the indicator mounted upon the windshield frame thereof, Figure 2 is a side elevational view of the indicator showing the angle bracket supporting the operating rods for the indicator arm, Figure 3 is a rear elevational view of the direction indicator, Figure 4 is a top plan view with a portion of the windshield frame shown in section, Figure 5 is a horizontal sectional view taken on line V—V of Fig. 2 showing the construction of the indicator arm, Figure 6 is a detail cross-sectional view taken on line VI—VI of Fig. 2, and Figure 7 is a detail sectional view taken at right angles to Fig. 6.

Referring more in detail to the accompanying drawing, there is illustrated an automobile direction indicator including an angle bracket or arm formed of a horizontal tubular section 1 and a vertical tubular section 2 open at adjacent ends and integrally connected as at 3 with a reinforcing web portion 4 as shown more clearly in Fig. 2. The mounting for the angle arm includes a lateral bracket 5 carrying a bolt anchored clamp 6 for engagement with the side rail 7 of a windshield frame as shown in Fig. 4, the bracket arm 5 projecting laterally from the inner end of the horizontal tubular section 1.

A shaft 8 is journaled in the tubular section 1 with the forward end thereof projecting beyond the tubular section and having a bearing in the lower projecting end walls 2ª of the vertical tubular section 2 having fixed thereon a bevel gear 9 shown in Fig. 2. The shaft 10 is journaled in the vertical tubular section 2 and carries a bevel gear 11 upon the lower end thereof that meshes with the bevel gear 9 upon the shaft 8.

An indicator arm in the form of an arrow is secured to the upper projecting squared end 10ª of the shaft 10, the indicator arm including a frame embodying upper and lower walls 12 and 13 respectively carrying an arrow head 14 at the forward ends thereof and a tail portion 15 at the rear end with transparent side walls 16 disposed at opposite sides of the frame of the indicator. On the indicator arm, as shown in Fig. 5 there is a centrally positioned block 17 that is anchored upon the squared end 10ª of the shaft 10, the indicator arm being anchored on the shaft by the retaining member 18 more clearly shown in Fig. 2. The bottom wall 13 of the indicator arm supports a plurality of electric lights 19 that are connected with a suitable source of current for illumination.

The operating means for the indicator arm includes a disc 20 secured to the rear end of the tubular section 1 and carrying adjacent the periphery thereof a plurality of stop members 21, a handle 22 being fixed to the rear projecting end of the shaft 8 to effect rotation thereof and limits in its movements by stops 22'.

From the above detail description of the device, it is believed that the construction and operation thereof will be at once apparent, it being noted that the direction indicator is supported on the windshield frame adjacent the operator's seat and upon shifting the handle 22 the rod shafts 8 and 10 are rotated for moving the direction indicator to the desired position as illustrated by arrow lines in Fig. 1.

While there is herein shown and described the preferred embodiment of the present invention, it is nevertheless to be understood that minor changes may be made therein without departing from the spirit and scope of the invention as claimed.

What is claimed as new is:—

In an automobile direction indicator, an angle member including a horizontal and a vertical tubular section, integrally formed and angularly cut away at adjacent ends, a depending flange carried by the outer edge of the vertical tubular section, a shaft journaled in each section, the forward end of the horizontal shaft being journaled in the depending flange, gear connections between the adjacent ends of the shafts, an indicator arm secured to the upper end of the vertical shaft above the vertical tubular section, a bracket for securing the member to the windshield frame of an automobile, a disk secured to the rear end of the horizontal tubular section, the horizontal shaft extending rearwardly through said disk, a handle secured to the end thereof, and spaced stop devices for the handle carried by said disk.

In testimony whereof I affix my signature.

ANTHONY SAJESKI.